United States Patent
Walton et al.

(10) Patent No.: US 7,617,663 B1
(45) Date of Patent: Nov. 17, 2009

(54) GRASS BOX DISCHARGE REAR PANEL

(75) Inventors: Ron Walton, Omaha, NE (US); John L. Marburger, Omaha, NE (US); Royce A. Steinert, Hutchinson, KS (US); James H. Keene, III, Omaha, NE (US)

(73) Assignee: Humboldt Specialty Manufacturing Co., Omaha, NE (US)

( * ) Notice: Subject to any disclaimer, the term of this patent is extended or adjusted under 35 U.S.C. 154(b) by 0 days.

(21) Appl. No.: 11/503,845

(22) Filed: Aug. 14, 2006

Related U.S. Application Data (60) Provisional application No. 60/707,737, filed on Aug. 12, 2005.

(51) Int. Cl.
*A01D 43/00* (2006.01)
*A01D 43/06* (2006.01)

(52) U.S. Cl. .................................................. 56/202
(58) Field of Classification Search ............... 56/202, 56/205, 16.6; 414/471, 467; 298/11, 23 D, 298/23 M, 25, 29, 30, 35 M
See application file for complete search history.

(56) References Cited

U.S. PATENT DOCUMENTS

| | | | | | |
|---|---|---|---|---|---|
| 2,544,505 | A | * | 3/1951 | Kronhaus | 414/554 |
| 3,135,080 | A | * | 6/1964 | Christiansen | 56/15.3 |
| 3,199,277 | A | * | 8/1965 | Moody | 56/16.6 |
| 3,450,284 | A | * | 6/1969 | Diem | 414/497 |
| 3,744,653 | A | * | 7/1973 | Jensen | 414/471 |
| 4,239,437 | A | * | 12/1980 | Naab | 414/408 |
| 4,447,089 | A | * | 5/1984 | Tegtmeier | 298/11 |
| 4,476,668 | A | * | 10/1984 | Reilly | 56/202 |
| 4,487,007 | A | * | 12/1984 | Mullet et al. | 56/16.6 |
| 4,523,788 | A | * | 6/1985 | Prasad | 298/11 |
| 4,569,187 | A | * | 2/1986 | Spiker et al. | 56/202 |
| 4,688,819 | A | * | 8/1987 | Reilly et al. | 172/439 |
| 4,709,541 | A | * | 12/1987 | Broman et al. | 56/202 |
| 4,972,666 | A | * | 11/1990 | Peruzzo | 56/206 |
| 4,989,917 | A | * | 2/1991 | Schmidt, Jr. | 298/11 |
| 5,080,442 | A | * | 1/1992 | Doering et al. | 298/6 |
| 5,193,882 | A | * | 3/1993 | Gamaldi | 298/11 |
| 5,456,529 | A | * | 10/1995 | Cheung | 312/245 |
| 5,778,648 | A | * | 7/1998 | Parkes et al. | 56/202 |
| 6,029,312 | A | * | 2/2000 | Whitney | 15/347 |
| 6,513,312 | B1 | * | 2/2003 | Ishimori et al. | 56/203 |
| 6,766,633 | B2 | * | 7/2004 | Wanie et al. | 56/202 |
| 7,047,718 | B2 | * | 5/2006 | Caroni | 56/205 |
| 7,322,176 | B2 | * | 1/2008 | Benway | 56/202 |
| 2004/0088961 | A1 | * | 5/2004 | Wanie et al. | 56/202 |

* cited by examiner

*Primary Examiner*—Árpád Fábián-Kovács
(74) *Attorney, Agent, or Firm*—Suiter Swantz pc llo (57) ABSTRACT

An apparatus comprising a container assembly defined by a plurality of panels coupled to a frame assembly, the plurality of panels comprising at least one releasable panel releasably coupled to the frame assembly, the releasable panel adapted to release and provide separation from the frame assembly and a release assembly coupled to the releasable panel suitable for providing force adequate to release the releasable panel from the frame assembly, the release assembly further comprising a lever and a plurality of bracket members pivotally coupled to a panel of the container assembly. The container assembly and release assembly are suitable for attaching to a portion of a grass cutting device, containing material collecting from the grass cutting device and discharging the material without detachment of the container assembly from the grass cutting device.

26 Claims, 10 Drawing Sheets

GRASS BOX DISCHARGE REAR PANEL

CROSS-REFERENCE TO RELATED APPLICATIONS

The present application claims the benefit under 35 U.S.C. § 119(e) of U.S. Provisional Application Ser. No. 60/707,737, filed Aug. 12, 2005. Said U.S. Provisional Application Ser. No. 60/707,737 is herein incorporated by reference in its entirety.

FIELD OF THE INVENTION

The present invention relates generally to accessories for grass cutting devices, and more particularly to an apparatus and method for providing rear discharge for a grass cutting device.

BACKGROUND

Some grass cutting devices provide for the attachment of a grass catcher for collecting grass clippings, leaves, twigs, and other debris as the lawn is mowed. During use of such grass cutting devices, foliage such as grass clippings and other debris exit the device through the discharge chute and are collected in a grass clipping bag. When full, the grass catcher is removed from the grass cutting device and emptied. This typically requires the operator of the grass cutting device such as a lawnmower to dismount and manually empty the foliage. In some instances it may be desirable to have a container that does not require manual removal of grass catcher contents.

Consequently, it would be advantageous to provide an apparatus and method for discharging material collected from a grass cutting device.

SUMMARY OF THE INVENTION

Accordingly, the present invention is directed to an apparatus for containing and discharging material collected from a grass cutting device. Apparatus may comprise a container assembly for containing foliage, debris and other material delivered into the container assembly from a grass cutting device via a chute or tube assembly operably coupled to the grass cutting device and the container assembly. Apparatus container assembly may comprise a frame assembly, a front panel and at least two side panels coupled to the frame assembly, and a releasable panel releasably coupled to the at least two side panels of the container assembly. Apparatus may further comprise a release assembly suitable for releasing the releasable panel to allow container assembly contents to be discharged.

In an additional aspect of an embodiment of the present invention, a system for containing and discharging material collected from a grass cutting device is disclosed. System may comprise a grass cutting device, a container assembly for containing foliage, debris and other material delivered into the container assembly from a grass cutting device via a chute or tube assembly operably coupled to the grass cutting device and the container assembly. System container assembly may comprise a frame assembly, a front panel and at least two side panels coupled to the frame assembly, and a releasable panel releasably coupled to the at least two side panels of the container assembly. System may further comprise a release assembly suitable for releasing the releasable panel to allow container assembly contents to be discharged.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DESCRIPTION OF THE INVENTION

Reference will now be made in detail to the presently preferred embodiments of the invention, examples of which are illustrated in the accompanying drawings.

Referring generally to FIGS. 1 through 4, a discharge apparatus 100 in accordance an embodiment of the present invention is shown. Discharge apparatus 100 may comprise a container assembly for containing foliage, debris and other material delivered into the container assembly from a grass cutting device via a chute or tube assembly operably coupled to the grass cutting device and the container assembly. Discharge apparatus container assembly may comprise a frame assembly 102, a front panel 104, at least two side panels 106 coupled to the frame assembly 102, and at least one releasable panel 108 releasably coupled to the side panels of the container assembly. Front panel 104 may be mounted substantially parallel to a portion of a grass cutting device onto which the apparatus 100 has been mounted, such as the rear or side of the grass cutting device, and side panels 106 may be coupled substantially perpendicularly to the front panel 104. In this manner, side panels may extend in a generally outward direction away from the grass cutting device, forming a substantially rectangular container. Releasable panel 108 may substantially comprise a back panel when the releasable panel is in a substantially closed position. In an alternative embodiment, container assembly may also comprise a back panel forming a back containing edge for the container assembly. It is further contemplated, that the discharge apparatus container assembly may be formed in any shape and of any material suitable for containing material within the container assembly. For instance, a discharge apparatus container assembly in accordance with an embodiment of the present invention may be comprised of a continuously formed frame assembly, such as in a substantially circular, elliptical or like shape, at least one continuously formed panel coupled to the frame assembly and at least one releasable panel 108 coupled to the continuously formed panel and substantially maintaining the shape of the frame assembly 102.

Figure 5:
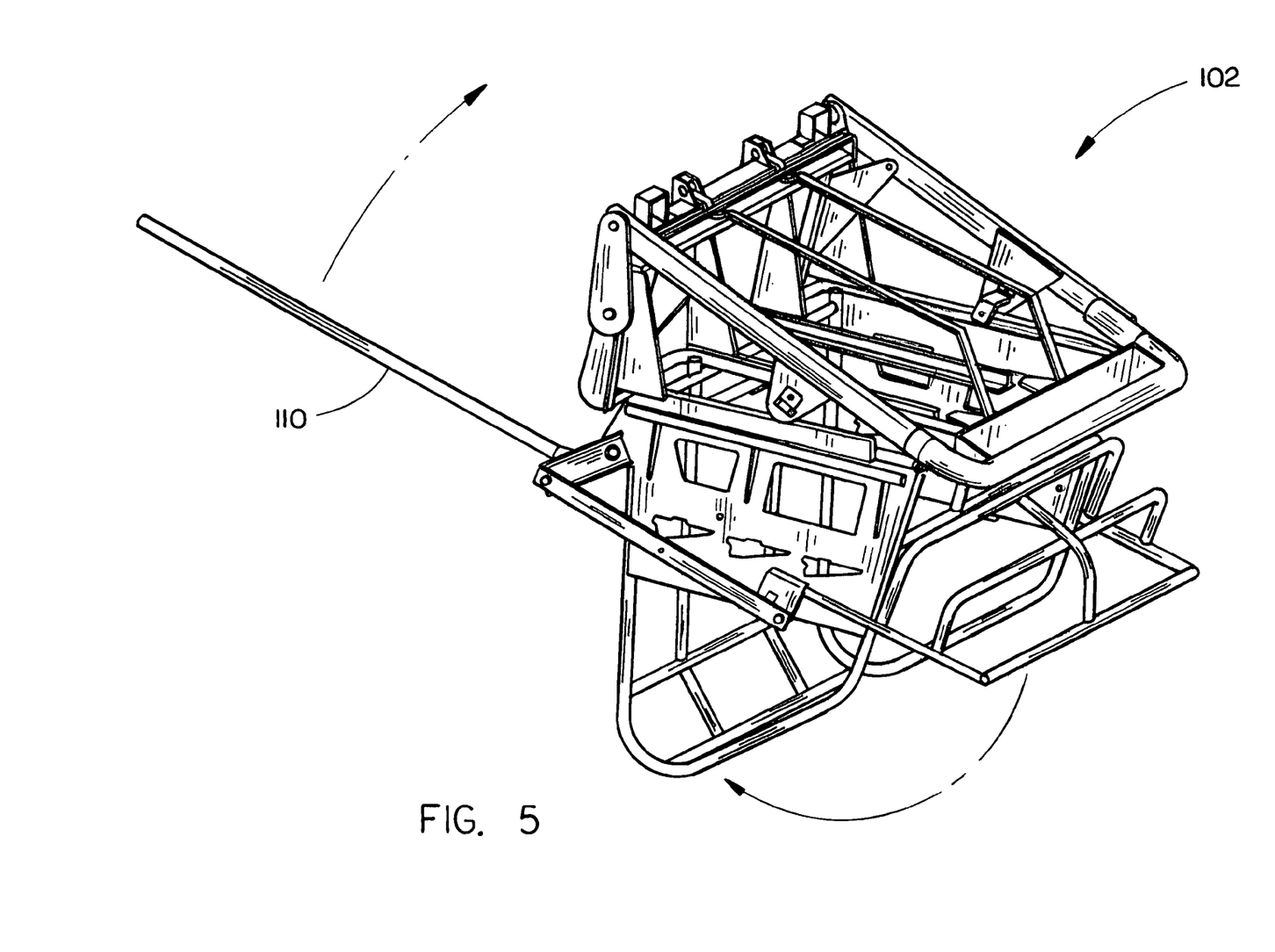
FIG. 5 is a perspective view of a discharge apparatus frame assembly in accordance with an exemplary embodiment of the present invention.

Referring to FIG. 5, a perspective view of a discharge apparatus frame assembly in accordance with an exemplary embodiment of the present invention is shown. In one embodiment, frame assembly 102 may be comprised of a plurality of components, coupled together to provide structural stability for the frame assembly 102. For example, frame assembly 102 may comprise rails, pipe sections or the like which may be welded together. Frame assembly components may be substantially fabricated from a durable material such as aluminum, steel, reinforced plastics, composites, or a combination thereof suitable for coupling with the grass cutting device. For example, one or more cylindrical components may be welded to one or more other cylindrical components comprising the frame assembly, forming a substantially rectangular frame for the apparatus container assembly. Side panels 106, front panel 104 and releasable panel 108 may be substantially comprised of a durable fabric, flexible plastic, or like durable material suitable such as steel or other such metal allow suitable for providing a rigid container for containing collected foliage and other material. Side panels 106 and front panel 104 may be coupled to the frame assembly 102 at one or more lateral edges of the rigid frame, and may house means for coupling the apparatus to a grass cutting device and means for coupling the top panel to the rigid frame. Additionally, front panel 104 or at least one side panel 106 may comprise an opening suitable for attachment of the material collecting chute.

Discharge apparatus 100 container assembly may further comprise a top panel hingedly coupled to the frame assembly 102. Top panel may be substantially fabricated from a durable material such as a durable fabric, aluminum, steel, reinforced plastic, composite, or a combination thereof suitable for providing a sealable cover for container assembly. Top panel may comprise a durable border suitable for coupling with the frame assembly 102. Top panel may be coupled to frame assembly with a hinge assembly, bracket assembly, latch assembly and the like, and may be suitable for rotating substantially upward and outward to provide access to container assembly contents. In an embodiment, top panel may be released from the frame assembly 102 via a lever or like mechanism.

Container assembly may further comprise a mounting assembly 114 suitable for releasably mounting the apparatus onto a grass cutting device. In an exemplary embodiment of the present invention, the discharge assembly frame assembly 102 may include components suitable for slidably attaching the discharge apparatus container assembly to a grass cutting device. For example, mounting assembly 114 may comprise rails, pipe sections, or the like which may be welded to one or more top edges of the frame assembly 102 for frictionally sliding along guide rails, into guide slots, or provide like coupling of the apparatus to a grass cutting device. It is further contemplated that apparatus may be adapted to attach to any grass cutting device or any material collecting device where a rear containing and discharging apparatus may be useful or desirable. It is contemplated that a grass cutting device may comprise a receiving assembly for slidably receiving the mounting assembly 114. For instance, the grass cutting device may be fitted with guide rails on which a grass cutting attachment, such as an embodiment of a rear discharge assembly 100 in accordance with an example of the present invention may slide to couple with the grass cutting device. In one embodiment, a portion of the grass cutting device may be capable of receiving a rear discharge assembly 100 that may replace a conventional three storage bag grass catching attachment. In a second embodiment, the container support may be configured to receive a discharge apparatus 100 that may replace a conventional two storage bag grass catching attachment. The frame assembly 102 and mounting assembly 114 may be formed of any suitable material including steel, aluminum, hardened plastic, and the like. Further, those of skill in the art will appreciate that other components may be used for slidably coupling the rear discharge assembly 100 to a grass cutting device, including rails having bearings, tabs mated with slots, and the like. Moreover, the number of bags in which the container support is designed to support may vary dependent upon user need.

Figure 1:
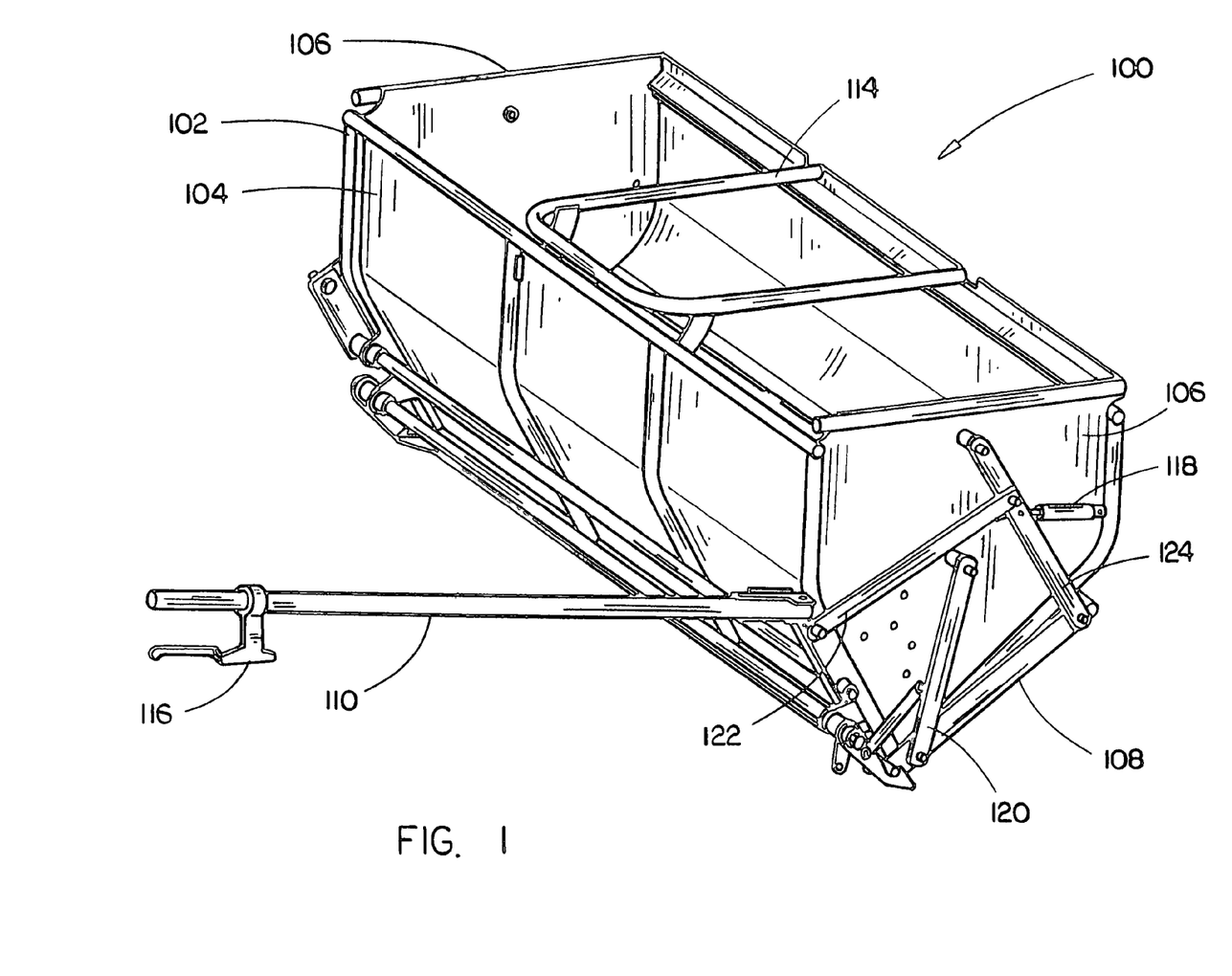
FIG. 1 is a perspective view illustrating a discharge apparatus in accordance with an embodiment of the present invention.
Figure 2:
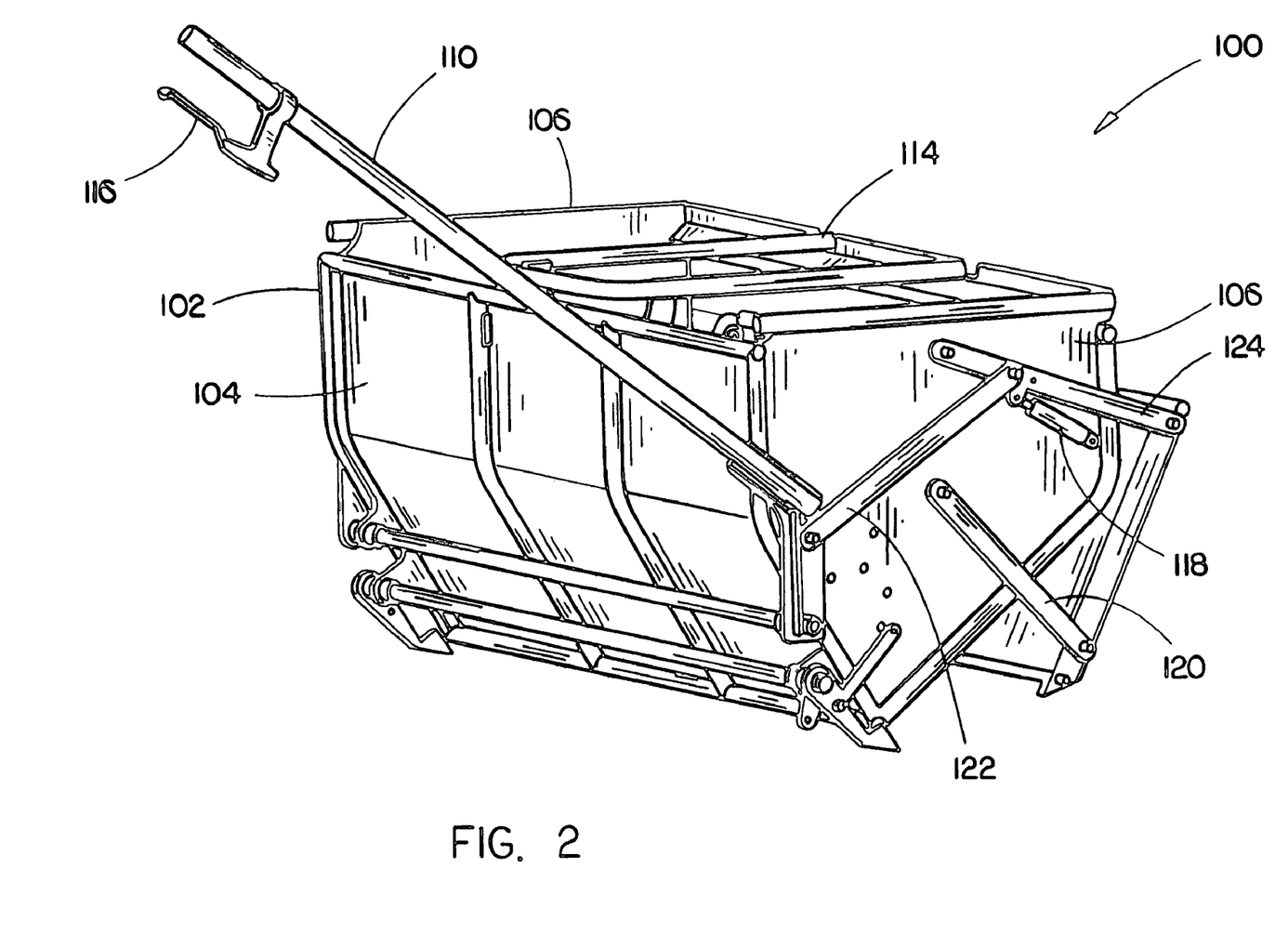
FIG. 2 is a perspective view illustrating the discharge apparatus in accordance with an exemplary embodiment of the present invention, wherein the releasable panel is shown in a partially opened position.
Figure 3:
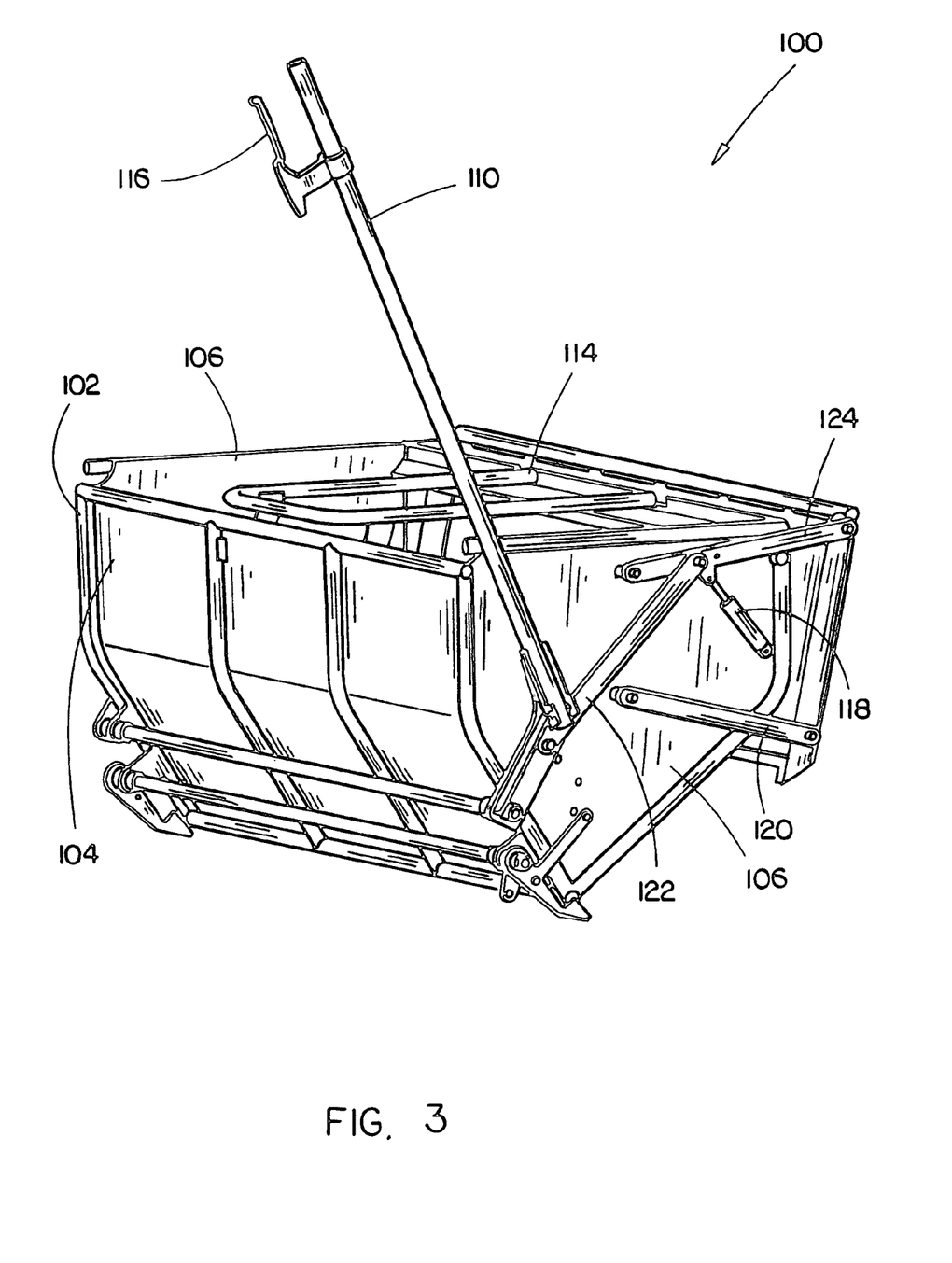
FIG. 3 is a perspective view of a discharge apparatus in accordance with an exemplary embodiment of the present invention, wherein the releasable panel is shown in an opened position.
Figure 4:
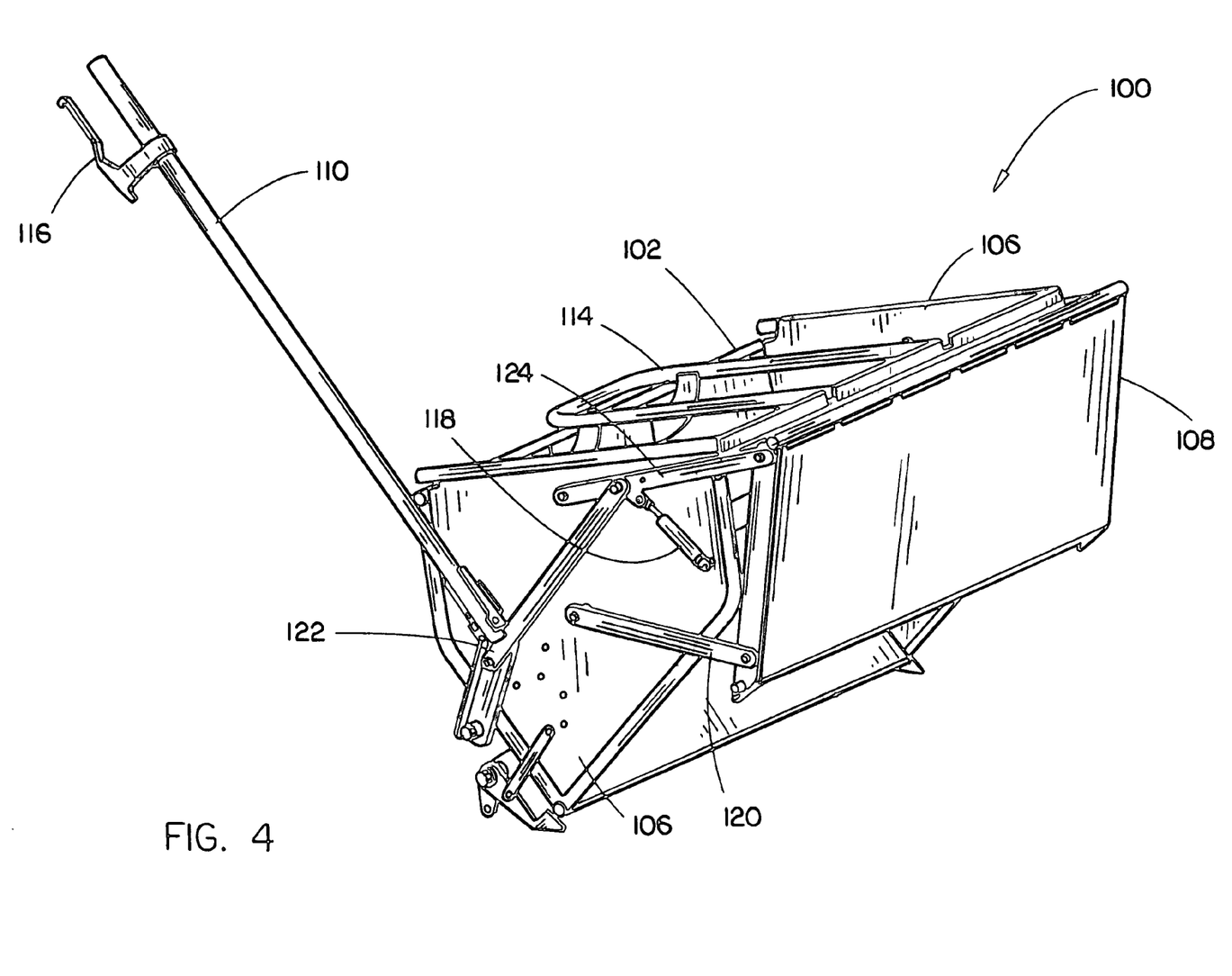
FIG. 4 is rear a perspective view of the discharge apparatus shown in FIG. 3, wherein the releasable panel is shown in an opened position.

Referring to FIGS. 2-4, perspective views illustrating a discharge apparatus in accordance with an exemplary embodiment of the present invention, showing the releasable panel 108 in partially and substantially opened positions are shown. Releasable panel 108 may be releasably coupled to the container assembly by a plurality of bracket support members 120-124 that engage with a release assembly suitable for providing release of the releasable panel 108. Release may be accomplished via a rotary actuating mechanism suitable for providing lift and separation of the releasable panel 108 from the container assembly. For example, a first end of a bracket support member 124 may be pivotally coupled to a side panel 106 of the container assembly, and a second end of a bracket support member 124 may be pivotally coupled to a lateral edge of the releasable panel 108. In this manner, releasable panel 108 may be releasably coupled to the discharge apparatus container assembly. Releasable panel release assembly may provide partial, substantial or complete separation of the releasable panel 108 from the apparatus container assembly. Bracket support members 120-124 may provide support of the releasable panel 108 while the releasable panel is separated from the container assembly and when the releasable panel is in the non-release or closed position. Release assembly may comprise a lever 110 having a handle 116 operably engaged with a series of bracket support members 120-124. Bracket support members 120-124 may be coupled to at least one side panel 106 for selective release of the releasable panel 108 to allow for discharge of container assembly contents. For instance, lever 110 may comprise a first end operably engaged with a first end of a pivotable bracket support member 122. When actuated in substantially upward direction, lever 110 may initiate downward motion of a first bracket support member 122. A second opposed end of the first pivotable bracket member 122 may be pivotally coupled with an end of a second pivotable bracket member 124. A second end of the second bracket support member 124 may be pivotally coupled with the releasable panel 108. A first end of a third bracket member 120 may be coupled with a side panel 106 and a second end of the third bracket support member 120 may be coupled with the releasable panel 108. Actuating the lever 110 may initiate suitable interaction among the bracket support members 120-124 to allow for release of the releasable panel 108 whereby an opening is formed to permit the discharge of container assembly contents. Additionally, release assembly may be operable by an operator without detaching the discharge apparatus 100 from a grass cutting device.

In one embodiment of the invention, releasable panel may be comprised substantially of a durable fabric. In this embodiment, release assembly may provide substantial folding or gathering of the fabric that an opening is formed and container assembly contents may be discharged. In this embodiment, at least one end of the releasable panel 108 may be substantially coupled to a back panel of the containing assembly. For instance, the end of releasable panel coupled to back panel may be a top end relative to the ground. An opposite end, for instance, the bottom end, may be disengaged from the containing assembly upon actuation of the release assembly and fold substantially upwards. The top end and the bottom end of the releasable panel may be brought substantially closer together by actuation of the release assembly. In an alternative embodiment, the releasable panel forms a side of the containing assembly, therefore not requiring coupling of the releasable panel to a back panel. A top edge of the releasable panel may be coupled to the frame assembly, and a bottom edge of the releasable panel may be coupled to a bottom edge of a container assembly front panel.

If desired, an operator may remove the container assembly from the grass cutting device and manually discharge container assembly contents. Manual discharge of container contents may be accomplished by uncoupling the container assembly from the release assembly and detaching container assembly from the grass cutting device. Additionally, an apparatus in accordance with an embodiment of the present invention may be utilized with any grass cutting device configured to receive a manual discharge bag collection system by removing the bags and installing the apparatus. In this manner, discharge apparatus mounting assembly 114 may be configured to fit any desired grass cutting device, including a grass cutting device suitable for receiving a grass catching assembly that does not provide material discharge.

The release assembly may be utilized to control the engagement, release and elevation of the releasable panel 108. It is further contemplated that one or more bracket support members 120-124 may be operably coupled to a hydraulic assembly 118. Hydraulic assembly 118 may comprise a cylinder, a piston and a support member. Hydraulic assembly 118 may provide additional support of the releasable panel 108 when the releasable panel 108 is released from the container assembly. The release assembly may be utilized to control and pump the hydraulic assembly 118 at the rearward end of the frame assembly 102. The release assembly may also be utilized to actuate a release of a locking safety device. For instance, release assembly may be ratcheted to allow incremental opening or closing of the releasable panel 108.

Apparatus 100 may further comprise a latching assembly for controllably preventing movement of the releasable panel. Latching assembly may be suitable for selectively holding the releasable panel in a desired position. For example, a grass cutting device operator may utilize a latching assembly to maintain the releasable panel 108 in a partially released configuration to allow for constant discharge of container assembly contents. Additional configurations such as a closed position, a substantially released position, a fully released position and the like may also be accomplished utilizing the latching assembly.

Figure 6:
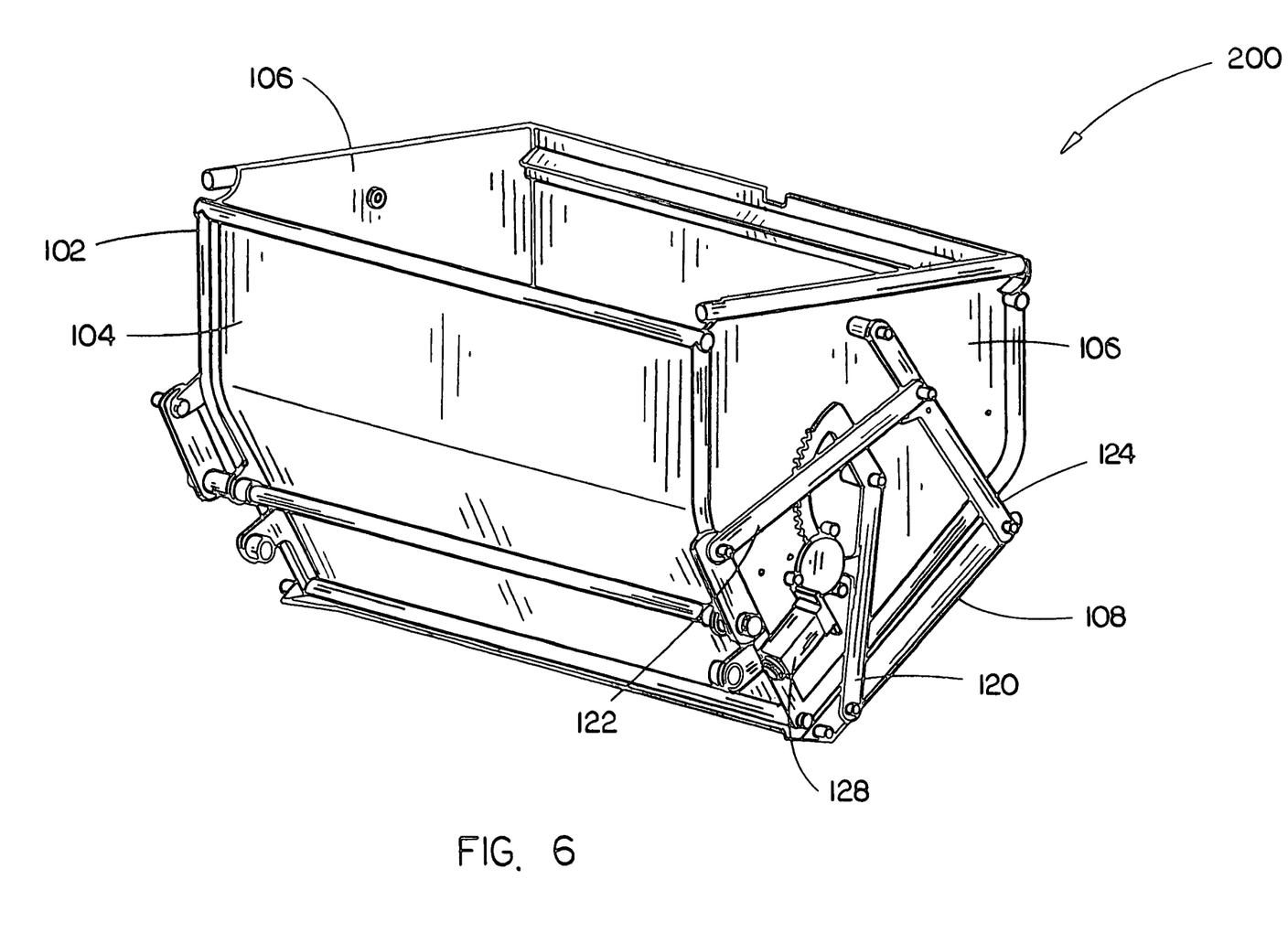
FIG. 6 is a perspective view of a motorized discharge apparatus in accordance with an exemplary embodiment of the present invention showing the releasable panel in a substantially closed position.
Figure 7:
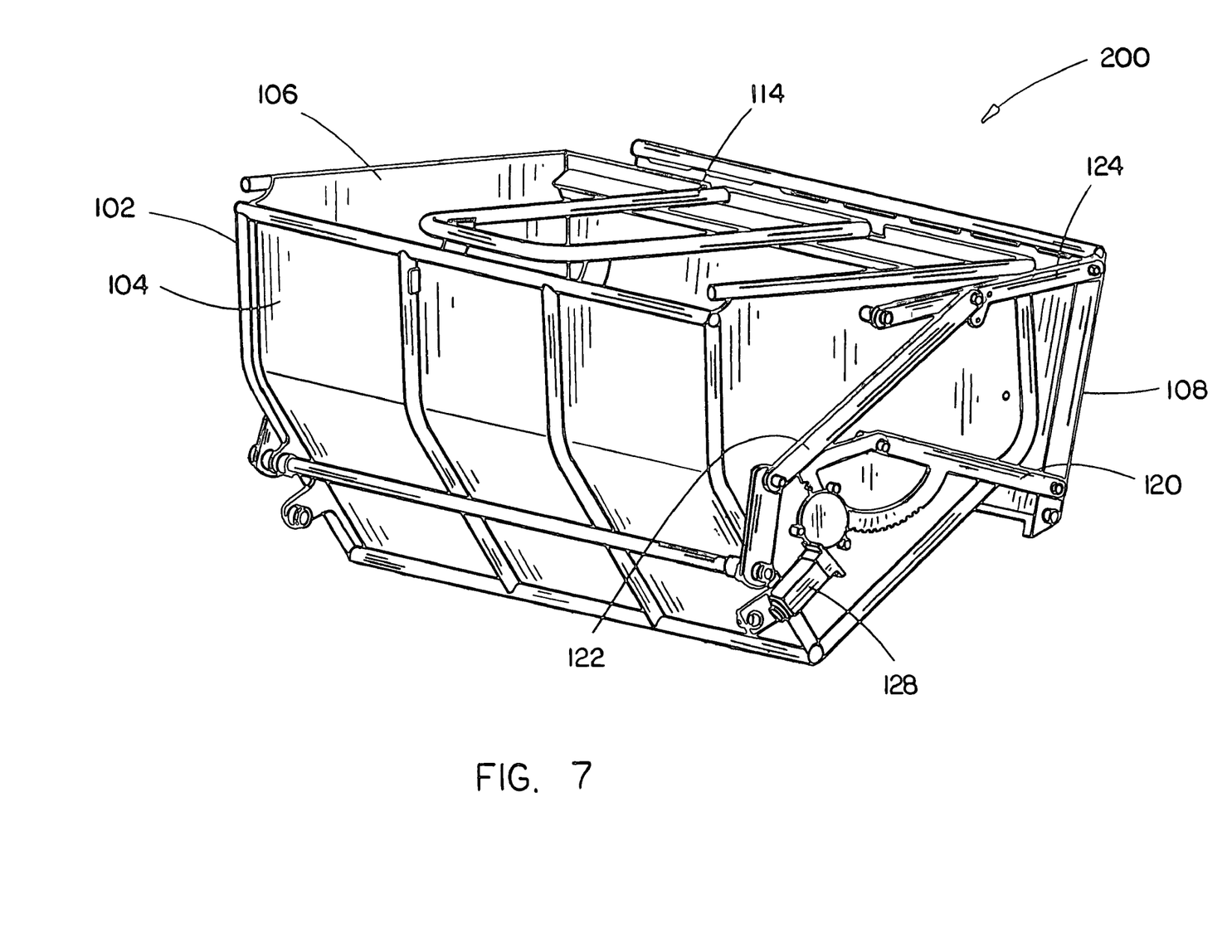
FIG. 7 is a perspective view of a motorized discharge apparatus in accordance with an exemplary embodiment of the present invention showing the releasable panel in a substantially opened position.

Referring to FIGS. 6 and 7, it is contemplated that release assembly may be a motorized release assembly 128. Motorized release assembly 128 may be physically coupled to a portion of the apparatus and electronically coupled to a switch, push button, joy stick or like operating mechanism located substantially on a deck or other such surface of a grass cutting device. Releasable panel 108 may be releasably coupled to the container assembly by a plurality of bracket support members 120-124 in a like manner as a discharge apparatus having a non-motorized release assembly. For example, a first end of a bracket support member 124 may be pivotally coupled to a side panel 106 of the container assembly, and a second end of a bracket support member 124 may be pivotally coupled to a lateral edge of the releasable panel 108. In this manner, releasable panel 108 may be releasably coupled to the discharge apparatus container assembly. Motorized release assembly 128 may provide partial, substantial or complete separation of the releasable panel 108 from the apparatus container assembly. Bracket support members 120-124 may provide support of the releasable panel 108 while the releasable panel is separated from the container assembly and when the releasable panel is in the non-release or closed position. Motorized release assembly may comprise a motor operably engaged with a series of bracket support members 120-124. Bracket support members 120-124 may be coupled to at least one side panel 106 for selective release of the releasable panel 108 to allow for discharge of container assembly contents. In one embodiment, at least one bracket support member 120 may further comprise a gear assembly, such as a cog wheel that may be driven by the motor to provide pivotal motion of the bracket support member and release of the releasable panel 108. A first end of the bracket support member 120 may be coupled with a side panel 106 and a second end of the bracket support member 120 may be coupled with the releasable panel 108. When actuated in substantially downward direction via the motor, the gear assembly may initiate upward motion of a bracket support member 120. A second opposed end of a pivotable bracket support member 122 may be pivotally coupled with an end of at least one other pivotable bracket support member 124. A second end of the bracket support member 124 may be pivotally coupled with the releasable panel 108. Motorized release assembly may initiate suitable interaction among the bracket support members 120-124 to allow for release of the releasable panel 108 whereby an opening is formed to permit the discharge of container assembly contents.

It is further contemplated that electronic coupling of motorized release assembly 128 may be wired or wireless and may be suitable for transmitting multi-directional motion commands from a switch to motor for motorized actuation of the releasable panel 108. For instance, motorized release assembly may receive a command to release the releasable panel in a substantially upward, downward or lateral direction command or any contemplated directional movement providing separation of the releasable panel and the frame assembly. Motorized release assembly may also receive an attach command to secure the releasable panel 108 to the frame assembly 102. Motorized release assembly may also receive a lock command to prevent the releasable panel 108 from undesired disengagement with the frame assembly 102.

It is further contemplated that release assembly may be any actuating, rotating, electromechanical or like assembly suitable for providing partial, substantial or complete release of the apparatus releasable panel 108. For instance, release assembly may comprise a mechanical lever, an electric, hydraulic, and pneumatic linear actuator, and an electric, hydraulic, and pneumatic rotary actuator. Release assembly may be a single unit suitable for providing transmission of force to an opposite side. In one embodiment, force may be transmitted with a torsion tube or like force transmitting assembly. In this embodiment, releasable panel may be actuated by an actuating assembly coupled to one side panel. In an additional embodiment, releasable unit may be a dual actuation assembly suitable to apply force on both sides of the apparatus for releasing the releasable panel.

In an alternative embodiment, discharge apparatus 100 container assembly may be comprised of a floor having a pair of pivotally supported discharge panels adapted to swing downwardly to a discharge state, permitting discharge of the contents of the container assembly by gravity. In a further alternative embodiment, container assembly may be comprised of a pivotally supported floor panel adapted to swing downwardly to a discharge state which permits gravity discharge of the content of the container.

Figure 8:
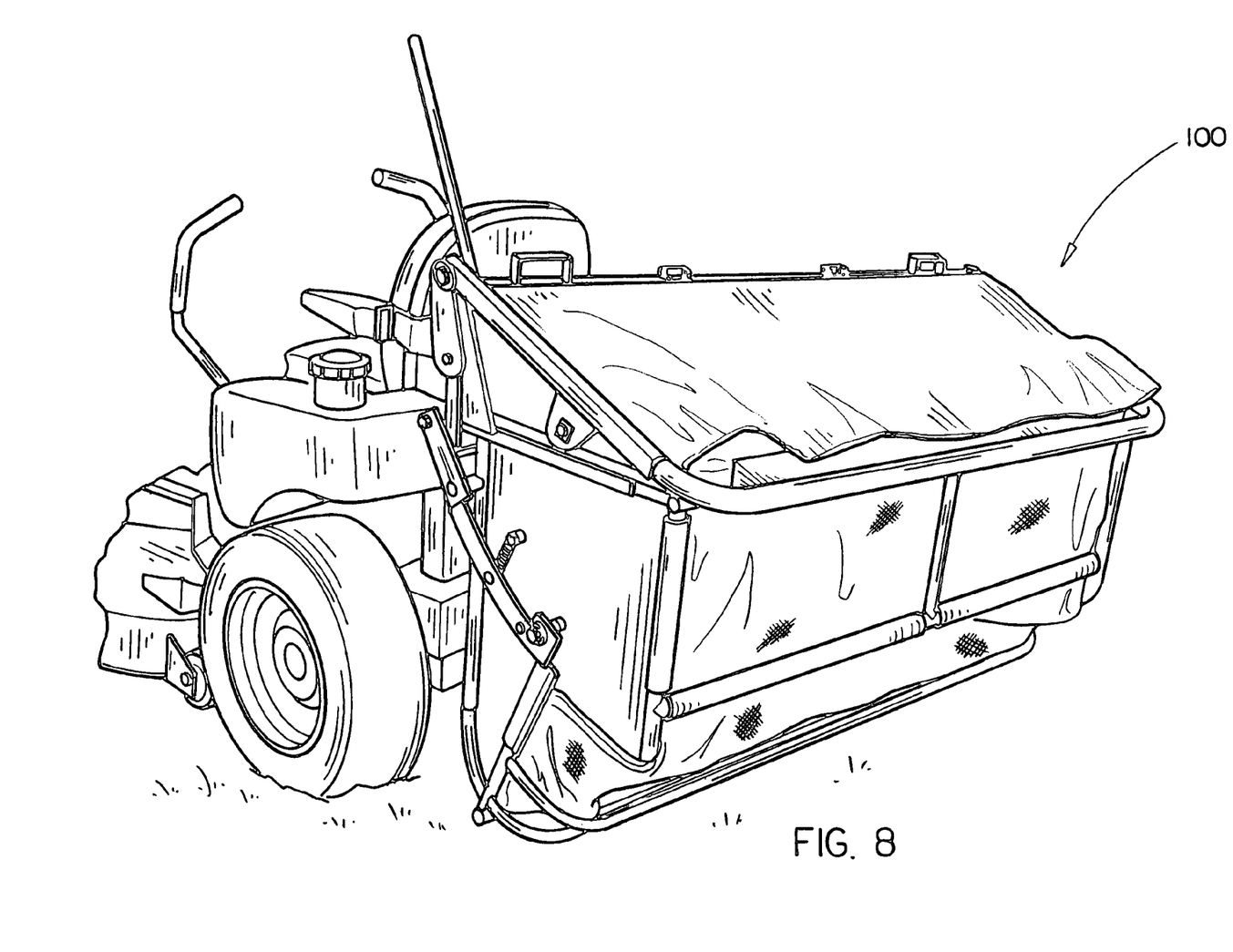
FIG. 8 is a perspective view of a discharge apparatus in accordance with an exemplary embodiment of the present invention employed with a grass cutting device showing the releasable panel in a closed position.
Figure 9:
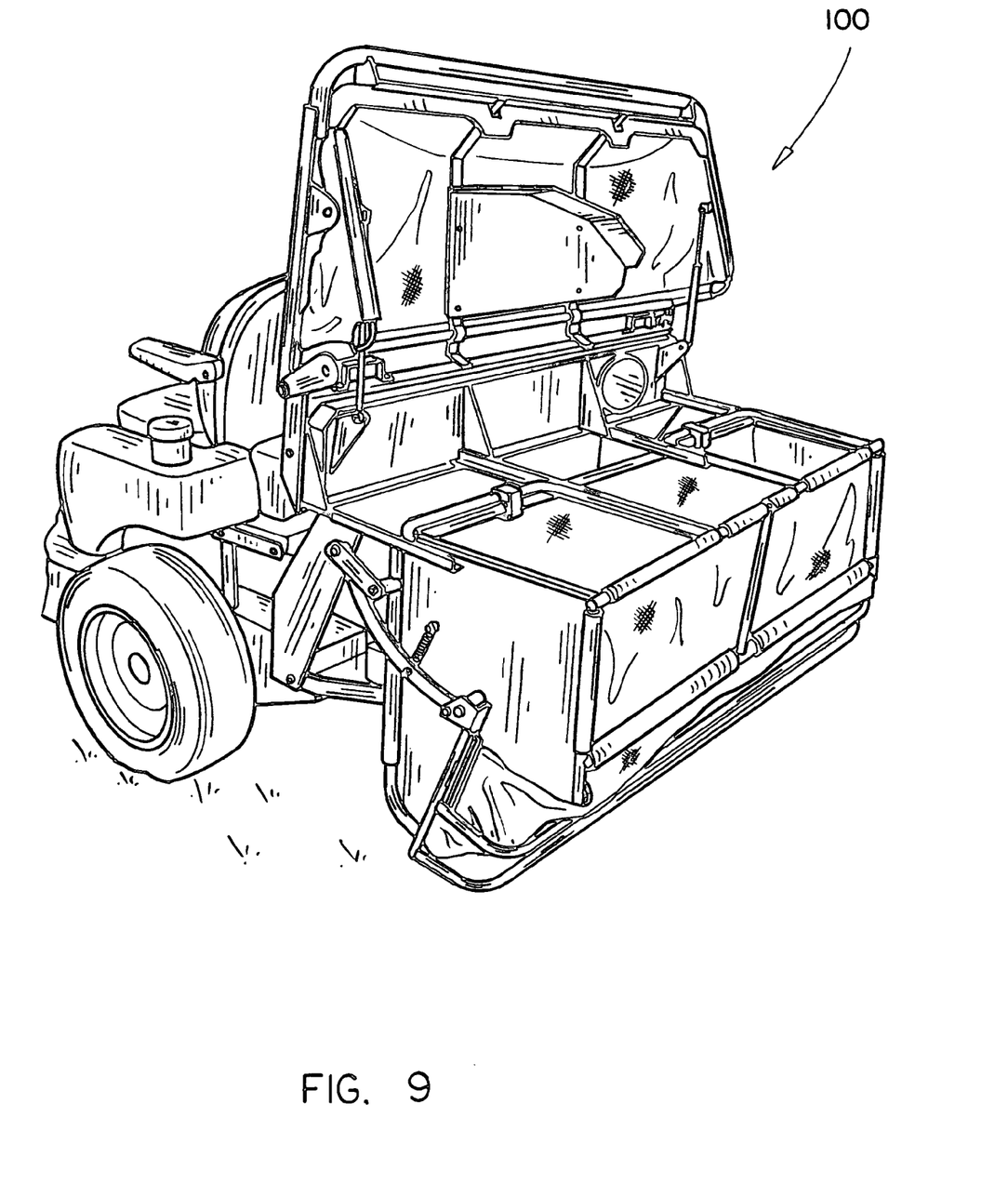
FIG. 9 is a perspective view of a discharge apparatus in accordance with an exemplary embodiment of the present invention employed with a grass cutting device showing the releasable panel in an open position.
Figure 10:
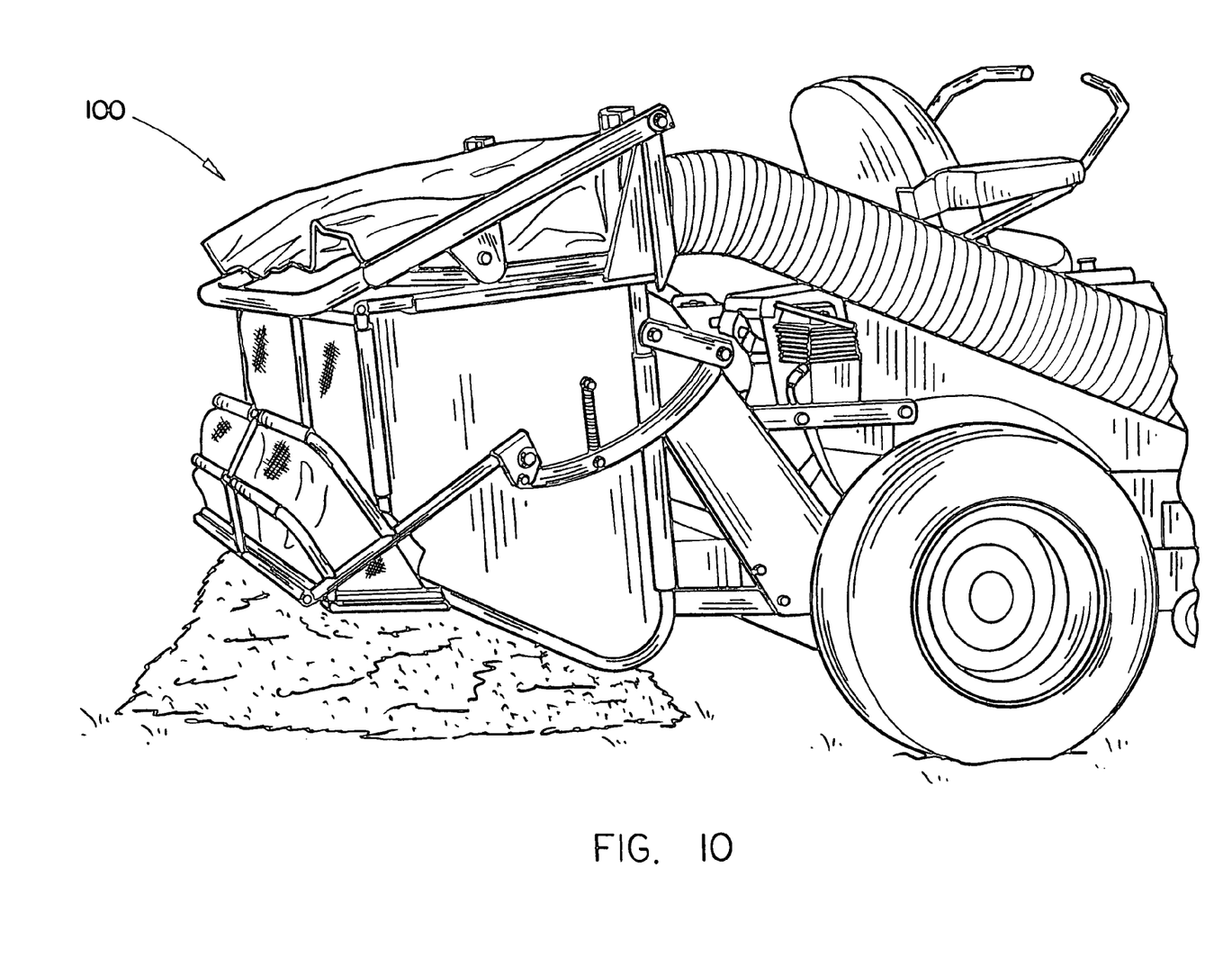
FIG. 10 is a perspective view of a discharge apparatus in accordance with an exemplary embodiment of the present invention employed with a grass cutting device showing discharge of container assembly contents.

Referring to FIGS. 8-10, a discharge apparatus 100 in accordance with an embodiment embodiments of the present invention coupled with a grass cutting device is shown. Specifically, FIG. 8 is a perspective view of a discharge apparatus in accordance with an exemplary embodiment of the present invention employed with a grass cutting device showing the releasable panel in a closed position. FIG. 9 is a perspective view of a discharge apparatus in accordance with an exemplary embodiment of the present invention employed with a grass cutting device showing the releasable panel in an open position. FIG. 10 is a perspective view of a discharge apparatus in accordance with an exemplary embodiment of the present invention employed with a grass cutting device showing discharge of container assembly contents. It is contemplated that discharge assembly 100 may be attached to any type of a grass cutting device. For instance, the discharge assembly 100 may be mounted to a mower assembly, in particular a riding lawn mower, or the like, for trimming grass and other vegetation from which clippings are generated. Riding lawnmower may be a seated or stand-up type lawnmower and may be suitable for receiving an attaching releasable material collecting device. Additionally, it is contemplated that a riding lawnmower may be adapted to receive an attaching releasable material collecting device such as an embodiment of the discharge assembly 100. For example, an exemplary discharge assembly 100 in accordance with the present invention, such as discharge assembly 100, may be coupled to a Hustler Z™ mower, a Hustler Super Z™ mower, a Hustler Mini Z™ mower, a Hustler Super Mini Z™ mower, a Land Pride Razor Pro™ mower, or the like. The clippings generated by the riding lawn mower may be collected and stored by the rear discharge assembly 100. In exemplary embodiments of the present invention, the clippings may supplied to the discharge apparatus 100 via a delivery system including a hose fed by a trimming implement of the riding lawn mower, such as a cutting blade, or the like. Those of skill in the art will appreciate that the clippings may be supplied to the discharge apparatus 100 in various manners without departing from the scope and intent of the present invention. For example, in one embodiment material may be fed to the discharge apparatus 100 through a passage in fluid connection between the riding lawn mower and the discharge apparatus 100. In an additional embodiment, material may be blown from a riding grass cutting device into the discharge apparatus 100 through an external chute.

In an additional aspect of an embodiment of the present invention, a system for containing and discharging material collected from a grass cutting device is disclosed. System may comprise may comprise a container assembly for containing foliage, debris and other material delivered into the container assembly from a grass cutting device via a chute or tube assembly operably coupled to the grass cutting device and the container assembly. System container assembly may comprise a frame assembly, a front panel and at least two side panels coupled to the frame assembly, and a releasable panel releasably coupled to the at least two side panels of the container assembly. System may further comprise a release assembly suitable for releasing the releasable panel to allow container assembly contents to be discharged. Release assembly may comprise a lever assembly and a bracket support member assembly. Release assembly may also comprise a hydraulic assembly operably coupled to at least one bracket support member. Hydraulic assembly may comprise a cylinder, a piston and a support member. The system may further comprise a mounting assembly suitable for mounting the container assembly onto a grass cutting device, and a top panel hingedly coupled to the frame assembly. At least one of the front panel or the side panels may further comprise an opening suitable for attachment of a material collecting chute. It is further contemplated that a system for providing discharge of materials for grass cutting devices may be motorized. It is even further contemplated that a system for providing material discharge may comprise a ratcheted release assembly to allow incremental opening or closing of the releasable panel, and a latching assembly for controllably preventing movement the releasable panel.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus comprising:
a container assembly defined by a plurality of panels coupled to a frame assembly forming a frame for said plurality of panels and conforming to the shape of said plurality of panels, and said plurality of panels being mounted within said frame assembly, said plurality of panels comprising at least one releasable panel releasably coupled to said container assembly via a plurality of bracket support members coupled to at least one side panel of said plurality of panels, and said releasable panel releasing substantially vertically to provide separation of said at least one releasable panel from said container assembly;
a mounting assembly suitable for coupling with a grass cutting device, said mounting assembly having a receiving assembly for receiving a grass catching device and providing attachment of said container assembly to said grass cutting device; and
a release assembly coupled to said at least one releasable panel suitable for providing force adequate to provide separation of said at least one releasable panel from said container assembly, said release assembly further comprising a lever and coupled to said plurality of bracket support members pivotally coupled to said at least one releasable panel of said container assembly, wherein said container assembly and said release assembly are suitable for attaching to a portion of a grass cutting device while said grass cutting device is operated to cut grass (A) containing material collected from said grass cutting device and (B) discharging said material without detachment of said container assembly from said grass cutting device while said grass cutting device is operated to cut grass.

2. The apparatus of claim 1, further comprising a hydraulic assembly operably coupled to at least one of said bracket support members, said hydraulic assembly providing increased support of said at least one releasable panel when said at least one releasable panel is released from said container assembly.

3. The apparatus of claim 2, wherein said hydraulic assembly comprises a cylinder, a piston and a support member.

4. The apparatus of claim 1, wherein the release assembly comprises a mechanical lever, an electric linear actuator, a hydraulic linear actuator, a pneumatic linear actuator, an electric rotary actuator, a hydraulic rotary actuator, or a pneumatic rotary actuator.

5. The apparatus of claim 1, further comprising a top panel coupled to the frame assembly.

6. The apparatus of claim 1, wherein said front panel comprises an opening suitable for attachment of a material collecting chute.

7. The apparatus of claim 1, further comprising a latching assembly for controllably preventing movement of said at least one releasable panel.

8. The apparatus of claim 1, wherein said release assembly is a motorized release assembly physically coupled to a side panel of said container assembly.

9. An apparatus comprising:
a container assembly defined by a plurality of panels coupled to a frame assembly forming a frame for said plurality of panels and a collected materials containing portion of said container assembly being positioned substantially within said plurality of panels, said plurality of panels comprising at least one releasable panel releasably coupled to said frame assembly, said at least one releasable panel releasing substantially vertically to provide separation of said at least one releasable panel from said frame assembly;
a release assembly coupled to said at least one releasable panel suitable for providing force adequate to release said at least one releasable panel from said frame assembly, the release assembly further comprising a lever and a plurality of bracket support members pivotally coupled to said at least one releasable panel of said container assembly, said plurality of bracket support members including:
a first bracket support member including a first end operably coupled to a first end of said lever, said first bracket support member receiving a force from said lever causing said first end of said first bracket support member to rotate substantially downward;
a second bracket support member including a first end coupled to a side panel of said container assembly and operably coupled with a second end of said first bracket support member, said second bracket support member further including a second end pivotally coupled with said at least one releasable panel; and
a third bracket support member including a first end coupled with said side panel of said container assembly and a second end coupled with said at least one releasable panel;

a top panel hingedly coupled to said frame assembly, said top panel providing a sealable cover for said container assembly and suitable for rotating about at least one axis substantially upward and outward to provide access to container assembly contents; and
a mounting assembly suitable for mounting said container assembly onto a grass cutting device while said grass cutting device is operated to cut grass,
wherein said container assembly and said release assembly are (A) containing material collected from said grass cutting device and (B) discharging said material without detachment of said container assembly from said grass cutting device while said grass cutting device is operated to cut grass.

10. The apparatus of claim 9, wherein said front panel comprises an opening suitable for attachment of a material collecting chute.

11. The apparatus of claim 9, wherein the release assembly comprises a mechanical lever, an electric linear actuator, a hydraulic linear actuator, a pneumatic linear actuator, an electric rotary actuator, a hydraulic rotary actuator, or a pneumatic rotary actuator.

12. The apparatus of claim 9, further comprising a hydraulic assembly operably coupled to at least one of said bracket support members.

13. The apparatus of claim 12, wherein said hydraulic assembly is operably coupled to at least one of said plurality of bracket support members, said hydraulic assembly provides increased support of said at least one releasable panel when said at least one releasable panel is released from said container assembly.

14. The apparatus of claim 9, wherein said release assembly is motorized.

15. The apparatus of claim 9, further comprising a latching assembly for selectively holding said at least one releasable panel in at least one of a closed position, or a substantially released position, a fully released position.

16. The apparatus of claim 9, wherein said mounting assembly provides attachment of said container assembly to a grass cutting device having a receiving assembly for receiving a grass catching device.

17. A system comprising:
a grass cutting device,
a container assembly coupled to said grass cutting device, said container assembly defined by a plurality of panels coupled to a frame assembly forming a frame for said plurality of panels and a collected materials containing portion of said container assembly being positioned substantially within said plurality of panels, said plurality of panels comprising at least two side panels coupled to said frame assembly and at least one releasable panel releasably coupled to said at least two side panels, said at least one releasable panel releasing substantially vertically to provide separation of said at least one releasable panel from said frame assembly; and
a release assembly coupled to said at least one releasable panel suitable for providing force adequate to release said at least one releasable panel from said frame assembly, the release assembly further comprising a lever and a plurality of bracket members pivotally coupled to said at least one releasable panel and at least one of said at least two side panels of said container assembly,
wherein said container assembly and said release assembly are suitable for attaching to a portion of a grass cutting device while said grass cutting device is operated to cut grass (A) containing material collected from said grass cutting device and (B) discharging said material without detachment of said container assembly from said grass cutting device while said grass cutting device is operated to cut grass.

18. The system of claim 17, further comprising a hydraulic assembly operably coupled to at least one bracket member.

19. The system of claim 18, wherein said hydraulic assembly comprises a cylinder, a piston and a support member.

20. The system of claim 17, wherein the release assembly comprises a mechanical lever, an electric linear actuator, a hydraulic linear actuator, a pneumatic linear actuator, an electric rotary actuator, a hydraulic rotary actuator, or a pneumatic rotary actuator.

21. The system of claim 17, further comprising a mounting assembly suitable for mounting said container assembly onto a grass cutting device.

22. The system of claim 21, wherein said mounting assembly provides attachment of said container assembly to a grass cutting device having a receiving assembly for receiving a grass catching device.

23. The system of claim 17, further comprising a top panel hingedly coupled to the frame assembly.

24. The system of claim 17, wherein said front panel comprises an opening suitable for attachment of a material collecting chute.

25. The system of claim 17, wherein said release assembly is motorized.

26. The system of claim 17, further comprising a latching assembly for controllably preventing movement of said at least one releasable panel.

* * * * *